Dec. 11, 1962 R. C. BRACEY 3,067,543
CONTAINERS FOR GROWING PLANTS
Filed March 9, 1961

INVENTOR:
Raymond C. Bracey
By: W B Harpman
ATTORNEY

United States Patent Office 3,067,543
Patented Dec. 11, 1962

3,067,543
CONTAINERS FOR GROWING PLANTS
Raymond Christopher Bracey, 418 Dunstable Road,
Luton, England
Filed Mar. 9, 1961, Ser. No. 94,508
1 Claim. (Cl. 47—38)

This invention relates to containers for growing plants. It may be utilised for small-sized containers capable of growing one plant, i.e. miniature flower pots, or for larger containers such as window boxes, seed trays, hanging baskets, exhibition boxes, general interior decor and the like, or for containers of considerable size and capacity, such as may comprise complete beds and borders, whether under cover from the elements or not.

It is an object of the invention to provide a container of this kind which is constantly irrigated so that plants grown within it do not need to be watered; all that is necessary is that a storage tank should be refilled with water or a suitable solution at infrequent intervals. The device according to the invention is simple in construction and cheap to produce, it allows plants to be grown with a minimum of attention, and moreover ensures that the water or liquid supplied to them is fed to them from the bottom of the soil layer in the container and not from the top. The invention is moreover ideally suited for use where plants are to be grown in non-nutritive media such as sand, food for the plant being supplied in the liquid with which it is irrigated.

According to the invention a container in which plants are to be grown is associated with a liquid storage tank capable of holding a different atmospheric pressure to that of the surrounding atmosphere the plant container having an opening in its lower region that communicates with the liquid storage tank.

By this means a quantity of liquid, which may be either water or a liquid manure or other nutritive solution, is maintained in the bottom of the container. This water is drawn by capilarity into the soil or other granular material which is contained within the container, and serves to keep this moist. As the water is lost from the solid media within the container either by evaporation or else by absorption by the plants, the water level in the lower region of the container is maintained constant by replenishment from the tank.

Figure 1:
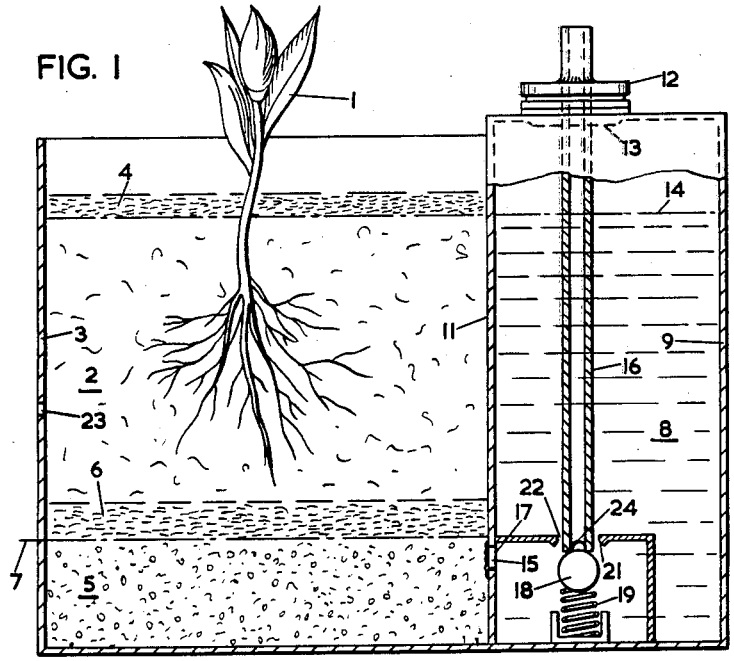
Figure 2:
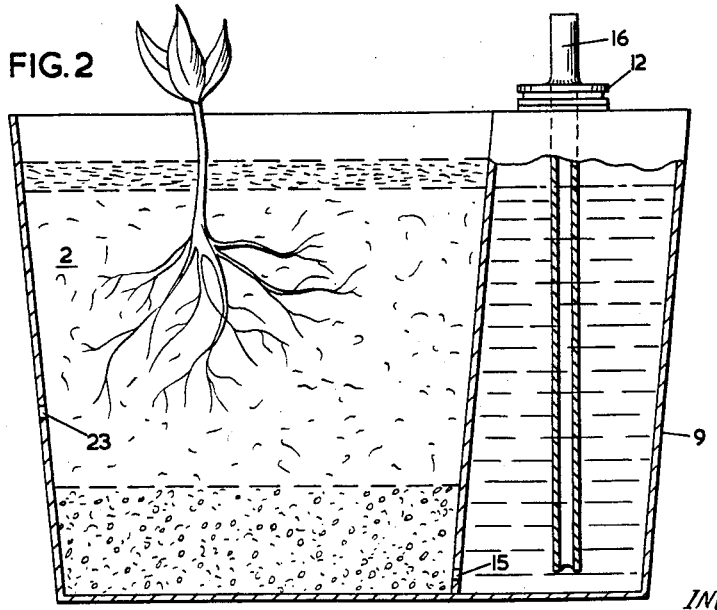

In order that the invention may be clearly understood, some embodiments thereof will now be described by way of example only with reference to the accompanying diagrammatic drawings in which:

FIGURE 1 is a cross section through a first embodiment of the invention, and
FIGURE 2 is a cross section through a second embodiment of the invention.

In FIGURE 1 of the drawings a plant 1 is shown growing in soil or other suitable porous media 2 within a container 3, the container 3 communicating with a storage tank 9 by an opening 15 in the lower region of the container 3. The soil or other porous media such as peat or sand or vermiculite is covered with a layer of fine gravel 4 in order to reduce evaporation from its top surface and needless loss of moisture, whilst in the bottom of the container there is disposed first of all a layer of coarse gravel 5 and a layer of fine gravel 6 below the soil or other finely divided porous material. If desired, these layers may be separated by a gauze or perforated sheet to prevent intermingling. The container 3 is maintained filled with water to a level 7, that is to a level approximating the region of the top of the layer of coarse gravel 5, this level being determined by the setting of the opening 15 since make up air can only pass into the tank 9 through the opening 15. This water slowly permeates the layer of fine gravel 6 and is then drawn by capillarity into the fine porous material to maintain this sufficiently moist to support the plant. The moisture content of the soil layer in the region of the plant roots can be maintained at a desired level to suit the requirements of the particular plant or plants being grown in the container by varying the thicknesses of the gravel layers. Thus, if the gravel layer 6 is made of considerable depth, then the water from the bottom of the container will be drawn into the soil at a much slower rate and the soil will be much dryer than if the layer 6 is of a shallower depth. Alternatively, the porous media 2 may be a coarser grained granular material, thus reducing the amount of liquid capable of being held in the media. It will be appreciated that when the porous material 2 is soil or peat or a similar material which contains nutrients for the plants, the liquid which will be maintained in the bottom of the container will generally be water whereas of the porous material is sand, or vermiculite the plants may be fed solely with nutrients obtained from the liquid supplied to them, and the liquid may be a dilute liquid manure, or alternatively this may be supplied in concentrated form and mixed with the material only inside the container.

This liquid 8 is contained within a tank 9 which is located adjacent to the plant container and which may have one wall 11 common with the plant container. The tank 9 can be filled at periodic intervals by removing a tightly fitting screw-down cap 12 which serves to close a filling orifice 13 which is of adequate dimensions to allow the tank to be quickly and easily filled. When the tank 9 is filled with liquid, for example to the level 14, and the cap 12 is secured tightly in position, liquid will not flow from the tank into the container 3 until the level of the liquid in the container has fallen below the level 7 so that make up air can enter the tank through the aperture 15 and then allow water to pass outwardly into the container 3 to maintain the liquid level therein constant.

Instead of relying upon air passing through the aperture 15, however, that is from amongst the porous material within the container 3, it is preferred that a separate air entry should be provided into the container 9. This may be in the form of a pipe 16 carried upon the closure cap 12 and extending downwardly into the liquid container to approximately the same level as the aperture 15. Then, when the water level in the container 3 has fallen below the level of the lower end of the pipe 16, air will enter the container 9 through the pipe 16 and allow water to be displaced through the aperture 15, until the water level within the container 3 is restored to its original value.

With this arrangement, it is not necessary for air to pass through the soil and therefore the aperture 15 in order that the water might leave the container 9. This helps to prevent the aperture 15 from becoming choked with small particles of soil or other porous material. In order to further protect the aperture from becoming choked in this manner a gauze filter 17 may be secured in position over the outside of the aperture 15. Thus, with the arrangement shown, so long as the tank 9 contains liquid, this will be fed to the container 3 at a suitable rate to maintain a constant quantity of liquid in the bottom of the container 3 at a desired level 7. The moisture content of the porous material 2 can therefore be kept at an almost constant value until the water in the container 9 falls below the level 7.

When the container 9 is to be refilled with liquid, the cap 12 is removed. As this is removed, the tube 16 is withdrawn from the container and the ball 18 moves under the force of the compression spring 19 to seat against the seating 21 to close the aperture 22. The container 9 can then be filled with liquid without the liquid passing through the aperture 15 to overfill the container 3. As soon as the cap 12 is replaced, however, the tube 16 will displace the ball from the seating 21 and thereafter liquid can flow from the container 9 into the container 3 to maintain the liquid level in the container 3 at the level 7.

It will be appreciated that should the device shown in FIGURE 1 be left outside, then if it should rain heavily it is possible for the container 3 to become overfilled with water. In order to prevent the container being overfilled to an extent which might be detrimental to the plants, an overflow aperture or apertures 23 is provided in the wall of the container to allow excess water to escape.

Also, in order to prevent any possibility of the end of the tube being sealed by the ball 18, the end of the tube is formed with an arcuate cutout 24 therein which is of a considerably different diameter to the diameter of the ball 18.

In FIGURE 2 there is shown the cross section of a similar apparatus to that illustrated in FIGURE 1 but which is of a somewhat simpler construction. In the apparatus shown in FIGURE 2 no valve arrangement is provided to prevent liquid flowing from the tank 9 into the container 3 through the aperture 15 when the cap 12 is removed. Thus, until the cap 12 is tightly replaced liquid will flow through the aperture or apertures 15 and will tend to overfill the container 3 with liquid or at least to fill the container 3 with liquid above the normally desired level. In order to minimise this overfilling effect, it is necessary that the container 9 should be filled with liquid as quickly as possible and the cap 12 is replaced in position to seal the container as quickly as possible. At the same time, it is desirable that the aperture 15 should be of a small diameter so that the quantity of liquid which can pass into the container 3 is reasonably small.

What I claim is:

A container in which plants are to be grown associated with a liquid storage tank capable of holding a different atmospheric pressure than that of the surrounding atmosphere, a secondary storage tank in the lower region of said liquid storage tank, said secondary storage tank having an opening communicating with said liquid storage tank, the plant container having an opening in its lower region that communicates with the secondary storage tank, a removable closure on said liquid storage tank, a vent tube which is positioned through and connected to said removable closure and enters said secondary liquid storage tank through said opening between the liquid storage tank and secondary storage tank, a spring urged ball valve positioned to seat in the last said opening upon removal of said closure and vent tube and to be unseated from the last said opening by one end of said vent tube upon replacement of said closure and vent tube.

References Cited in the file of this patent

UNITED STATES PATENTS

| | | |
|---|---|---|
| 818,356 | Davis | Apr. 17, 1906 |
| 1,085,992 | Nilsson | Feb. 3, 1914 |
| 2,150,605 | Lester | Mar. 14, 1939 |
| 2,288,678 | Blumentritt | July 7, 1942 |
| 2,425,026 | Breese | Aug. 5, 1947 |